Jan. 19, 1932. G. H. BRUNS 1,841,936
AEROPLANE WING
Original Filed July 11, 1929 4 Sheets-Sheet 4
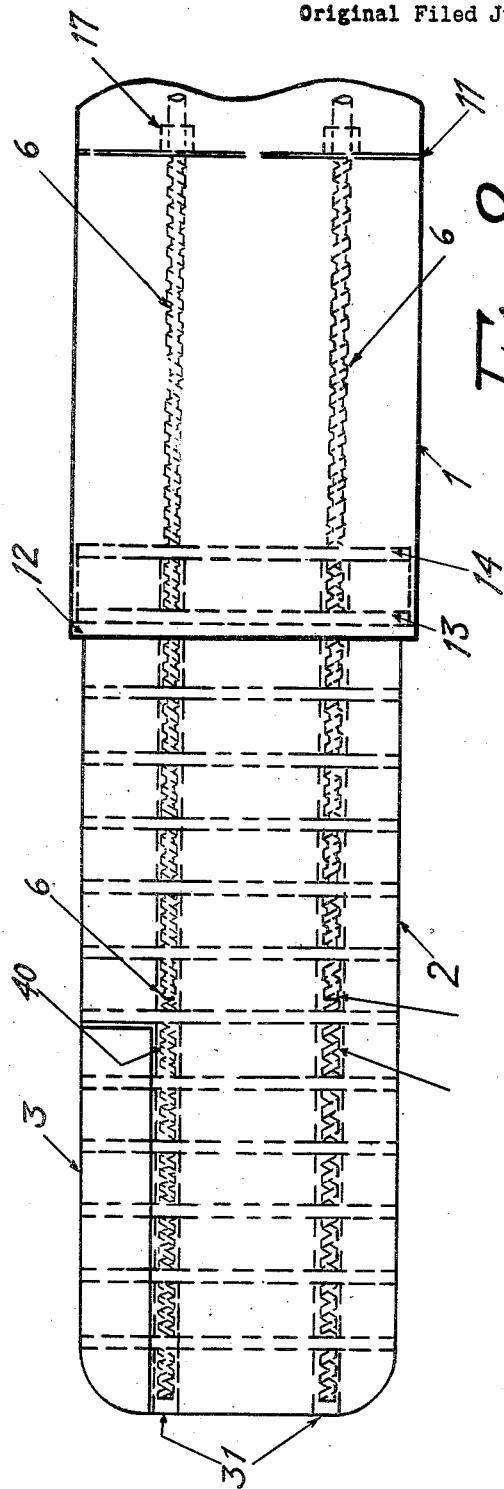
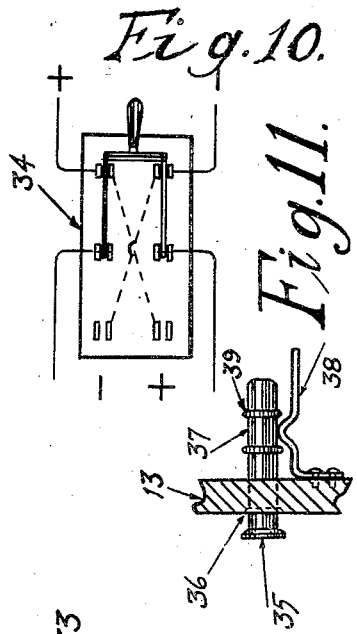
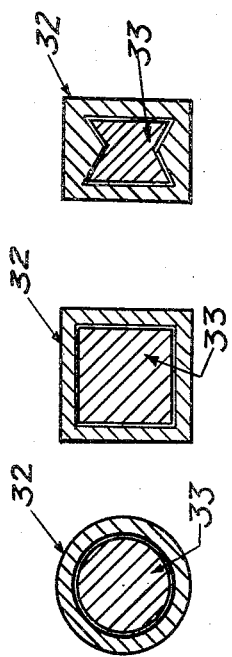
Inventor:
George H. Bruns.

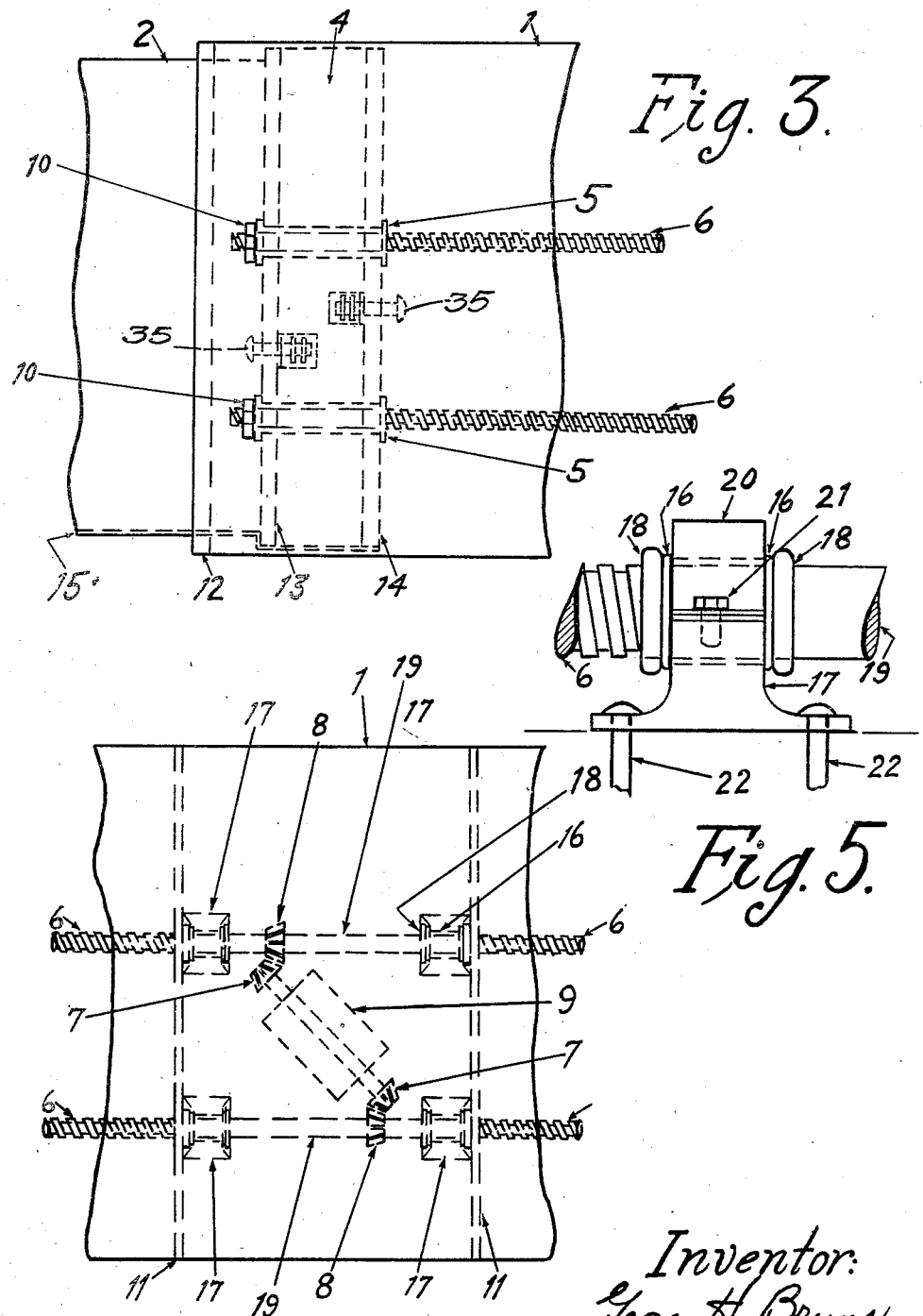

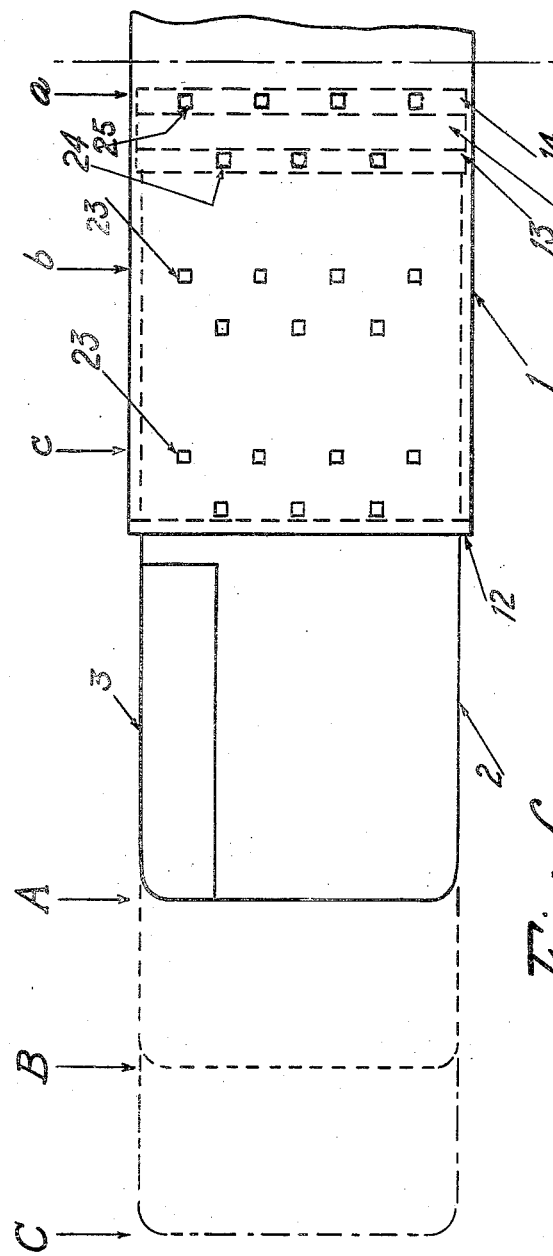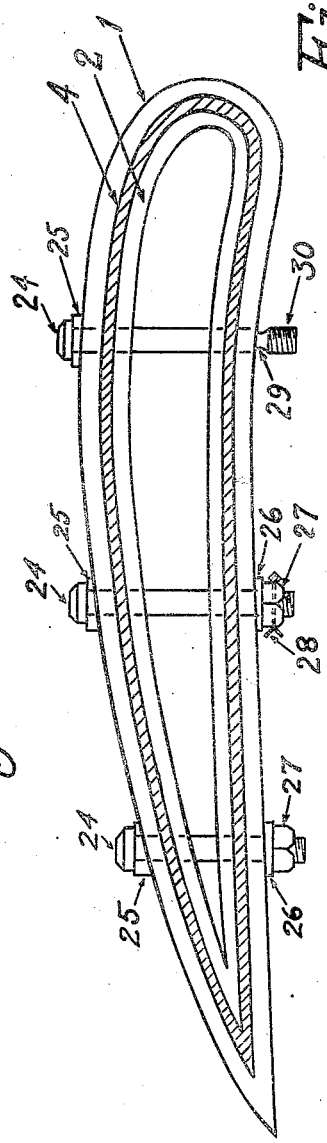

Patented Jan. 19, 1932

1,841,936

UNITED STATES PATENT OFFICE

GEORGE H. BRUNS, OF JAMAICA, NEW YORK

AEROPLANE WING

Application filed July 11, 1929, Serial No. 377,532. Renewed June 6, 1931.

My invention relates primarily to means for eliminating a considerable proportion of the wing drag in flight, which is incident to the conventional condition that wing area required to obtain lift at take-off of an aeroplane and to attain flying altitude is greatly in excess of wing area necessary in horizontal or generally horizontal flight. My invention also comprises a means for reducing the landing speed of an aeroplane by utilizing the aforesaid drag to decelerate speed in air prior to landing. More inclusively, my invention is intended to provide a means of increasing the pay load and lifting capacity of an aeroplane, its ratio of flying speed to power, its cruising radius, and its climbing speed and maneuverability; and to enable the angle of ascent and descent to be made more nearly vertical than has been possible theretofore with aeroplanes of conventional type. At the same time my invention is intended to reduce fuel consumption per flying mile, and to provide a greater degree of safety and better performance under all conditions of loading, take-off, flight and landing.

It is therefore the chief object of my invention to reduce, after flying altitude has been attained, the wing area employed at take-off to an amount more nearly commensurate with flight requirements; and, if desired, to again employ the larger area as a drag or brake in landing.

A modification of my invention comprises varying the wing area, while on the ground, to specific positions for varied loading.

As wing lift varies directly with wing area the necessity of a larger wing at take-off and during initial climb to flying altitude is obvious. As wing drag likewise varies directly with wing area the advantage of reducing the wing area in flight is indicated by the resulting conservation in power required to obtain any specific speed, as reduced drag reduces the power requirements. This is evident from the commonly used formula, H. P. = (drag) × (velocity per unit of time), for if the factor in the formula represented by (drag) is reduced, the product obtained for required horse-power is correspondingly less.

It is known that reducing wing area, while it increases the weight per square foot, also increases the maximum horizontal speed at all altitudes; and conversely, that increasing wing area, while it decreases the weight per square foot, also increases the rate of climb, particularly at the ground, and reduces the time required to climb to altitudes. Increase in wing area provides further, a higher service and absolute ceiling. Of particular importance to the requirements of safety, an increased wing area provides a greatly decreased landing speed. It will be understood that where reference is made to increased and decreased wing area it is an increase or decrease with respect to an aeroplane in which the component parts, other than the wings, remain of constant size.

According to my invention the wing area is varied by varying the span of the wing proper. It is evident that reducing the span will reduce the area, and conversely, increasing the span will increase the area. This, as is readily apparent, varies the aspect ratio as determined by either of the usual formulae, $$\frac{\text{Span}^2}{\text{Area}} \quad \text{or} \quad \frac{\text{Span}}{\text{Chord}},$$

and permits advantageous use of high aspect ratio at take-off with resultant great lift at a small angle. As laboratory experiment and tests seem to indicate that the advantages of increasing the wing area of an aeroplane cease at a certain limit, apparently at a minimum loading of twenty pounds per square foot, it is contemplated that the maximum spans employed in any applications or adaptations of my invention to any particular type or size of aeroplane, will not be greater than that span which provides a minimum loading of approximately twenty pounds per square foot for any specific design, size, or type.

I attain the objects of my invention by the means illustrated in the accompanying drawings, in which:

Fig. 3 is a plan view in diagrammatic form, of a typical wing detail, with part of the apparatus I may employ.

Fig. 4 is a plan view in diagrammatic form, illustrating an operating mechanism I may employ.

Fig. 5 is a vertical section of a piece of apparatus I may employ.

Fig. 6 is a diagrammatic plan of the right half or semi-span of an aeroplane wing embodying a modification of my invention and illustrating how the wing may be adjusted to fixed positions on the ground.

Fig. 7 is a vertical section across the wing, or in airfoil view, showing diagrammatically the details of a locking means I may employ in the modification of my invention to compromise fixed adjustments of the span, made on the ground.

Fig. 8 is a diagrammatic plan of the right half or semi-span of an aeroplane wing embodying my invention and illustrating the combination of a monocoque mid-portion and a retractile portion of rib and spar construction, with interlocking threaded and grooved spars.

Fig. 9 represents in vertical section, several spar modifications of non-threaded type slidably recessed, which may be employed in connection with the modification of my invention for fixed adjustments on the ground.

Fig. 10 is a plan view of a conventional type of reversing switch which I may employ.

Fig. 11 is a vertical section of a conventional type of circuit breaking device which I employ as a stop limit means.

Similar numerals refer to similar parts throughout the several drawings.

Figure 1:
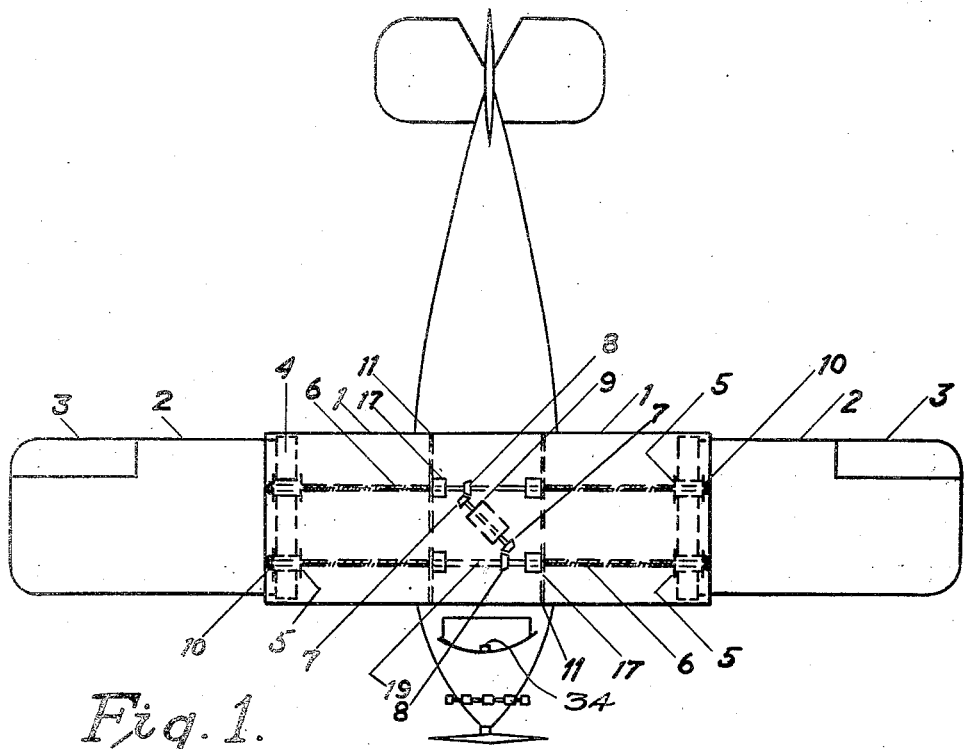
Fig. 1 is a diagrammatic plan of an aeroplane of the high wing monoplane type, embodying my invention and illustrating the wing extended to maximum span, as for take-off or landing.

In the illustration shown in Figure 1, the wing comprises a fixed portion 1—1, and retractile portions 2—2 symmetrically disposed with respect to the fixed portion so that the combination forms a complete aeroplane wing which is aerodynamically and statically adequate at all degrees of projection or retraction of the retractile portions 2—2. These portions are slightly smaller in airfoil or cross section measurements to permit their being telescoped within the fixed portion for part of their length in such manner as to obtain relatively greater and lesser span of the whole wing. Position of ailerons is shown at 3, and the inner end of the retractile portions is indicated as 4. Elongated nuts 5, appropriately threaded for right and left turn, are firmly fixed to and stationary within the retractile portions; and if the movable screws 6 are caused to rotate within the stationary nuts, the portions 2—2 are retracted or projected in an obvious manner, thus reducing or increasing the span accordingly. Rotation of the screws is induced by comparatively rapid revolutions of the motor 9, to the axis of which are affixed the bevel gears 7, as shown, to engage the gears 8 on the screw shaft. The gear sizes will be proportioned to secure minimum and maximum spans within a very short interval of time, with smooth and uniform operation inwardly and outwardly. A locking device 10, of any convenient type, as a castellated nut and cotter pin, may be used at outer ends of screws. Light metal sheathing 11, or the like, may be used to enclose the operating mechanism and motor; and hatches of adequate size may be located at convenient points in the wing to facilitate repairs and inspection of the apparatus. The motor 9 is further provided with a switch 34 of reversible type operated from the pilot's seat, which is employed for the obvious purpose of extending and retracting the span, in accordance with the direction of rotation of the motor as determined by position of the switch. The motor is equipped with any usual tripping device which acts to cut out the power and discontinues rotation of the screws when points of maximum and minimum span are attained. (See 35 in Fig. 3). It is further obvious that by manipulation of the switch various degrees of projection and contraction may be obtained by the pilot, between the maximum and minimum span, for special conditions, as for instance, to secure reserve wing area in the event of ice forming on area previously used.

Figure 2:
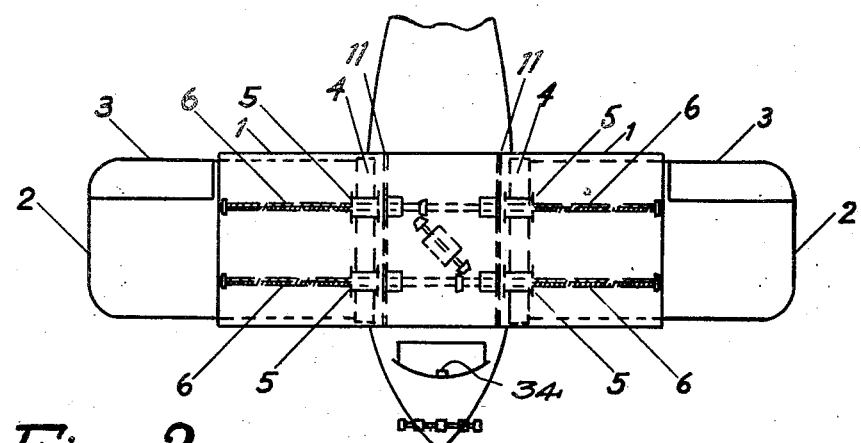
Fig. 2 is a diagrammatic plan of the same aeroplane with the wing retracted to minimum span, as for flying in the air.

Figure 2 illustrates the converse position where the portions 2—2 are retracted, for minimum span, within the fixed portion 1—1. In the illustration the innerly end 4 abuts the fire-wall or motor enclosure 11 when minimum span is employed. The method by which portions 2—2 are retracted is clearly shown by noting the position of the screws 6 and nuts 5 with respect to and in comparison with their relative positions in Figure 1.

In Figure 3 the retractile portion 2 is slightly withdrawn into the fixed portion 1 to illustrate the two ribs 13 and 14 between which the elongated nuts 5 are fixed, in the present instance, to receive the screws 6; and a nut and cotter pin locking device are shown at 10. The retractile portion may be of wood or metal, of spar and rib type or of full monocoque or semi-monocoque construction, and with fabric, wood, or metal covering as indicated by 15. A rib or similar device, as a false rib 12, may be inserted at the outer end of portion 1, on the inner surface of the wing, to serve as a convenient closure and check when the rib 13 abuts the false rib 12 on maximum emergence of the retractile portion for full span. Stop limiting devices 35 of the circuit make and break type automatically discontinue operation of the motor when maximum and minimum span is obtained.

Reference to Figure 4 indicates a motor 9 conveniently mounted, in the present instance, within the wing portion 1—1 at a point over the major axis of the fuselage. The motor is provided with a reversing switch and equipped with an automatic cut-out as previously described. The motor is conveniently placed at an angle with the axis of the wing; and to the shaft of the motor on each side are firmly fixed the gears 7 which engage the gears 8 mounted on the screw shafts at 19. It is evident that the revolutions of the motor will be transmitted to the screw shafts through the gears in such manner as to cause the shafts 19 to revolve within the holding devices 17 which are rigidly attached to the aeroplane structure in such a way as to maintain alignment of the screws and to prevent warping or distortion of the wing. As the shafts revolve the screws 6 are turned in desired direction for projecting and retracting the wings as hereinbefore described. As the screws are continuous through the wing, they will describe right and left turns on each side of the centre respectively; hence the nuts 5 will be threaded contrariwise, right and left; the nuts on left of centre being left threaded and those on right of centre being right threaded, or vice versa.

Figure 5 illustrates a housing device which may be employed for holding and retaining in position the shafts 19 and their threaded portions 6, and which with the said shafts contributes to the rigidity of the wing. A lower section 17 is suitably curved to receive the shaft 19 and is rigidly attached to the aeroplane structure by the bolts 22; and an upper section 20 is likewise curved to hold the shaft securely when the two sections are joined by the bolts 21. The upper section is thus removable to permit repairs by withdrawing the bolts. A non-friction bearing 16 is employed to facilitate rotation of the shafts, and collars 18 are fixed in position on the shafts to prevent lateral displacement. The outer portion of the shaft is threaded as 6 while the central portion is plain surface.

The nuts 5 throughout all views are shown affixed between the two innermost ribs of the retractile portions of the wing. It will readily appear that the location of the nuts may be between other ribs; or where hollow spars are employed, or where a cavity may be made in a solid spar in the structure of the wing, an elongated nut may be inserted and affixed within the spar; or the inside of the spar may be otherwise threaded to engage the screw, in addition to or in place of the nuts 5 as shown; thereby providing in effect, continuous spars through the wing; the screw being designed as a spar or beam for loading and stresses involved.

Figure 6 represents a modification of my invention to an aeroplane wing in which the span may be varied as indicated by the several distances A—, B—, and C—. The drawing shows the right half or semi-span of a monoplane wing in which 1 is a fixed central portion and 2 is a retractile portion. In and through the fixed portion, perforations 23 are indicated in three locations, as at $a$—, $b$—, and $c$—. Lateral pins as fixation members are shown at 24 and 25, inserted to lock the wing; in which position of the retractile portion with respect to the fixed portion, a minimum span is obtained. By withdrawing the series of pins 24 and 25, the retractile portion may be partly withdrawn from within the fixed portion. The inner end 4 of the retractile portion may then be located at one of several positions between the maximum and minimum span, as at $b$—, for instance. The two ribs 13 and 14 of the retractile portion are perforated to conform with the like perforations in the fixed portion. When lateral pins are inserted through the holes 23 and corresponding holes in the retractile portion, a rigid wing is formed. Obviously the span so selected cannot be altered in flight. This modification of my invention contemplates no operating mechanism as hereinbefore described, but views the span as being determined and fixed on the ground, prior to flight, to conform to varying conditions and altered performance requirements of the aeroplane. It will be noted that the rows of lateral pins are staggered in the present instance. Grommets may be used to reinforce the perforations.

Figure 7 is an airfoil view of the wing in cross section, in which the retractile portion 2 is shown within the fixed portion 1 with a row of lateral pins 24, in place. The locking means here shown comprises ordinary pins, threaded as at 30 to receive castellated nuts 27 locked with cotter pin 28. Washers may be inserted between the wing surface and the heads of the lateral pins and the nuts respectively. These washers may be ground to coincide with curvature of the wing at the point where washer is employed. If the wing surface is of varied curvature each washer-block will be marked to identify its location in the assembly. The blank shoulder of the pin, 29, extends slightly beyond the wing. The nuts cannot, therefore, be turned down beyond this point, thus eliminating possibility of injury to the wing. Thin slideable discs may be hinged at their peripheral portion to close over the perforations not in use.

Figure 8 illustrates the semi-span of a wing comprising a fixed monocoque portion 1, and a retractile portion 2 of usual spar and rib type. The retractile portion 2 is shown in the drawing as projected for maximum span. The screws 6 in this instance are recessed within the hollowed spars 31 of the retractile portion. The interior surface of the cylindrical cavity of spars 31 is cut in a spiral groove 40, conforming to the spiral thread of the screws 6. Thus the spars 31 serve as elongated nuts and since the screws are recessed therein for a considerable portion of their length even at maximum span position, the joint is always strong and rigid, and the engagement of screw and spiral groove forms in effect a continuous beam, of variable length, throughout the wing. The screws 6 are mounted and actuated as heretofore described.

Reference to Figure 9 indicates a modified application of the recessed spars. Several slideably recessed beams 33 are shown within the cavity of the hollowed spars 32, both being non-threaded. These may be employed particularly in the modification of my invention to fixed adjustments on the ground, non-alterable in flight, when a monocoque mid-portion and retractile portions of rib and spar construction are employed in the wing structure. The beams 32 are mounted in fixed elements as described for mounting the rotatable screws 6 heretofore, but obviously no actuating means are employed for rotating the smooth surfaced beams, which serve to support the retractile portions.

Figure 10 illustrates a type of switch which may be used for reversing the direction of the motor actuating the screws, in order to obtain alternately increased and decreased span. An ordinary knife switch is shown for convenience of illustration although it will readily appear that any reversing type of operating switch may be used for this purpose. The reversal of the negative and positive poles causes reversal of the motor in a manner that is commonly known to the art.

Figure 11 is a typical tripping device which I may employ for automatically discontinuing operation of the motor at maximum and minimum span. Such stop limit means is desirable to prevent over travel of the retractile portions inwardly or outwardly, and over actuation of the screws with consequent damage to the apparatus employed. The moveable element 35 is depressed in the countersunk area 36 of the rib 13 on maximum projection of the retractile portion of the wing. This breaks the contact between the conducting surface 37 and the spring element 38. The rings 39 are non-conductors. The spring contact 38 causes the moveable element 35 to return to position of completed current as the mechanical pressure on 35 is removed. The motor is inoperative only with respect to over travel outwardly when 35 is depressed in rib 13 on maximum projection. As the switch is thrown to effect retraction the circuit is completed through the contacts of a similar stop limit means in rib 14 (see Fig. 3) and the process alternates as maximum and minimum span is obtained. The particular stop limit device illustrated is generally conventional and operates in a manner commonly known to the art. It will be understood that various types of devices for this purpose are available.

The details of my invention and of the apparatus which I employ to carry out my objects may be modified to conform to the requirements of wings of various types of design and assembly, and with special facility may be applied to full monocoque and semi-monocoque wings. For convenience of illustration and conciseness of description I have indicated my invention in the specification and drawings herewith, as applied to a high wing monoplane having a non-tapered wing with no dihedral angle or sweep back. It will be understood that this implies no such limitation in practice. My invention may be applied to large biplanes by duplicating the means and apparatus employed and synchronizing the operating mechanism for control of upper and lower wings. In the case of monoplanes with dihedral or sweep back wings, the consequent angularity about the centre of the wing span may be provided for in the apparatus by such familiar and usual modifications as introducing idler gears, or dividing the shafts at the centre, in a manner that will be readily understood without detailed description. Likewise the apparatus which I employ in carrying out my invention may be varied to include, for instance, an hydraulic device in lieu of motor actuated screws, and these substitutions and modifications of details may be operated to produce the same results as the particular arrangement of apparatus now indicated. Similarly the extension of the retractile principle herein disclosed, to include a multiple telescoping of several portions, one within the other, will be obvious; particularly for the wings of giant aeroplanes with tremendous spans; and whereas I illustrate the retractile portion as slightly smaller in airfoil measurements in order that it may be telescoped within the fixed portion, it is clear that the retractile portion, if full monocoque, may be made slightly larger than the fixed portion and retracted to enclose the fixed portion, without departing from the principle and spirit of my invention.

The term aeroplanes as used in this specification will be understood to include any type of heavier than air flying craft, whether land plane, sea plane, or amphibion. The term wings will be understood to include wings with thick or thin airfoils of any cross section, and of any plan or camber. The term nut refers to a block with a cylindrical cavity having a spiral groove cut round upon the surface of this cavity, corresponding with the thread of the screw engaged thereby.

As it is obvious that the principles of my invention may be carried out by other means and that many of the details may be varied and changed, I do not desire to limit myself to the exact disclosure otherwise than is required by the scope of the appended claims.

I claim as my invention:—

1. In an aeroplane, a wing having in each semi-span a fixed portion and a retractile portion moveable in telescopic relation to the fixed portion; longitudinal elements disposed within stationary elements affixed generally midway between the wing tips; engaging elements affixed to the retractile portions, within which engaging elements the longitudinal elements may be variably recessed; means for actuating the longitudinal elements in such wise as to vary the amount so recessed; and an automatic stop limit means connected to the actuating means for preventing over actuation of the longitudinal elements within the engaging elements inwardly and outwardly; whereby the amount of the longitudinal element so recessed within the engaging element may be altered to vary the span of the wings while flying in the air.

2. In an aeroplane, a wing having in each semi-span a fixed portion and a laterally moveable retractile portion; a plurality of parallel longitudinal elements having their innerly portions disposed in stationary elements and outerly disposed within engaging elements affixed to the retractile portions; the longitudinal elements thereby adapted to receive the stresses imposed on the retractile portion independently of like stresses on the fixed portion; means for actuating lateral travel of the engaging elements upon the longitudinal elements, and correspondingly inducing lateral travel of the attached retractile portions; and means for automatically preventing over actuation of the longitudinal elements and over travel of the retractile portions inwardly and outwardly; thus permitting the span of the wing to be varied while flying in the air.

3. In an aeroplane, the combination of a wing having a fixed portion and retractile portions moveable in telescopic relation to the fixed portion, screw elements longitudinally disposed within the wing and centrally supported within stationary elements, grooved elements affixed to the retractile portions to engage the said screw elements, a source of power rotating the screws, means for controlling application of the said power and for varying rotating direction of the screws, and an automatic stop limit means for preventing over rotation of the screws within the grooved elements, whereby the span of the wing may be varied while flying in the air.

4. In an aeroplane, a wing having a fixed portion of monocoque construction and retractile portions of rib and spar construction moveable in telescopic relation to the fixed portion; longitudinal screw elements revolvable within stationary elements in the fixed portion; a cylindrical cavity lengthwise through the interior of the spars of the retractile portion and a spiral groove cut round upon the surface of the cavity to correspond to the thread of the screw elements which are thereby engaged; means for rotating the screws whereby the amount recessed within the spar is alterable to increase or decrease the span of the wings.

5. Apparatus representing an aeroplane wing with respectively a fixed portion and retractile portions arranged in telescopic relation thereto, gear operated screw shafts longitudinally disposed within the wing and centrally mounted on a bearing within rigid housing means, elongated nuts affixed to and within the retractile portions to engage the screw shafts, a switch controlled reversible motor actuating the gears, and a tripping device acting as a stop limiting means, whereby the span of the wings may be varied by the rotation of the screws within the fixed nuts of the retractile portions.

6. In an aeroplane, a wing having in each semi-span a fixed portion and outwardly extending portions moveable in telescopic relation to the fixed portion; a specific series of elements positioned in the peripheral surface of the fixed portion, wherewith correspondingly specifically positioned complementary elements in the root area of the moveable portion may be made to coincide for locking the moveable portion in one of the said coinciding positions, and means for locking and unlocking the said complementary elements while on the ground exclusively, whereby the length of each semi-span may be equally altered for a predetermined wing span unalterable in flight.

7. Apparatus representing an aeroplane wing with respectively a fixed portion and retractile portions so arranged as to be sheathed within the fixed portion at any of several specific positions; the retractile portions being perforated at their inner ends and the fixed portion being correspondingly perforated at several points, in such wise as the perforations of the retractile portions may be placed in several positions to correspond with perforations of the fixed portion; and means for locking the retractile portions rigidly in position selected, while the aeroplane is on the ground, whereby the span of the wing may be altered before flight.

8. In an aeroplane, the combination of a self-contained wing proper having an immoveable mid-portion and outwardly extending portions manually moveable in telescopic relation to the mid-portion, several specifically indicated points on the peripheral surface of the fixed portion wherewith like indicated points on the moveable portions may be made to coincide, and means for locking the said moveable portions in one of several specific positions of coinciding points, whereby the length of each semi-span is equally altered while on the ground, for a predetermined wing span unalterable in flight.

9. In an aeroplane, a wing having a fixed portion of monocoque construction and laterally moveable portions of rib and spar construction in telescopic relation to the fixed portion; plain surfaced longitudinal elements centrally disposed within stationary elements within the fixed portion; a cavity lengthwise through the interior of the spars of the moveable portions, the said cavity being of same cross sectional form and dimensions as the longitudinal elements; the said longitudinal elements being recessed within the cavity in varying amounts as the moveable portions of the wing are manually projected or retracted to obtain superimposed position of specifically indicated points of the respectively fixed and moveable portions whereby the span is varied in specific amounts while on the ground and locked so as to be unalterable in flight.

10. In an aeroplane, a wing having in each semi-span a fixed portion and a retractile portion moveable relatively with respect to the fixed portion; the fixed portion of monocoque construction; a plurality of cantilever elements outerly disposed within engaging elements attached to the retractile portion and centrally disposed within stationary elements; the stationary elements rigidly affixed to the aeroplane structure; the retractile portion supported entirely by the said cantilever elements and the respective fixed and retractile portions structurally independent; whereby the dynamic stresses imposed on the retractile portion are transmitted directly to the aeroplane structure by the cantilever elements, and the stresses imposed on the fixed portion are limited to the loads thereon apart from like loads on the retractile portion.

11. In an aeroplane, in combination with a retractile wing, means for supporting the retractile portion of each semi-span in such wise as to avoid transmitting dynamic stresses on said portion to the structure of the fixed portion; said means comprising a plurality of longitudinally extended cantilever elements centrally disposed within stationary elements and outerly engaged by elements positively connected to the retractile portion; the said stationary elements rigidly attached to the aeroplane structure, which thereby receives all stresses of the retractile portion, as transmitted exclusively by the cantilever elements; the fixed portion separately attached to the aeroplane structure in such wise as the stresses thereon are transmitted independently of the cantilever elements, the stationary elements, and the loads on the retractile portion; whereby all unidirectional, multidirectional, and torsional forces imposed on the respective portions are resisted by the said respective portions separately.

In testimony that I claim this as my invention, I have hereunto subscribed my signature.

GEORGE H. BRUNS.